(12) United States Patent
Helmig

(10) Patent No.: US 10,337,670 B2
(45) Date of Patent: Jul. 2, 2019

(54) PRESSURE VESSEL

(71) Applicant: KAUTEX TEXTRON GMBH & CO. KG, Bonn (DE)

(72) Inventor: Raimund Helmig, Cologne (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 241 days.

(21) Appl. No.: 15/322,222

(22) PCT Filed: Jun. 12, 2015

(86) PCT No.: PCT/EP2015/063116
§ 371 (c)(1),
(2) Date: Dec. 27, 2016

(87) PCT Pub. No.: WO2015/197375
PCT Pub. Date: Dec. 30, 2015

(65) Prior Publication Data
US 2018/0209587 A1    Jul. 26, 2018

(30) Foreign Application Priority Data
Jun. 27, 2014 (DE) ................. 10 2014 009 342

(51) Int. Cl.
*F17C 1/16* (2006.01)
*B29C 49/00* (2006.01)
(Continued)

(52) U.S. Cl.
CPC ............... *F17C 1/16* (2013.01); *F17C 13/06* (2013.01); *F17C 13/084* (2013.01);
(Continued)

(58) Field of Classification Search
CPC .... F17C 2205/0305; F17C 1/16; F17C 13/06; F17C 13/084; F17C 2260/011
See application file for complete search history.

(56) References Cited

U.S. PATENT DOCUMENTS 3,698,589 A * 10/1972 Perry ................. A47J 41/02
                                                      220/560.1
3,843,010 A    10/1974 Morse et al.
(Continued)

FOREIGN PATENT DOCUMENTS

CN          102695906       9/2012
DE     10 2010 023 386     12/2011
(Continued)

OTHER PUBLICATIONS

PCT International Search Report dated Oct. 2, 2015, received in corresponding PCT Application No. PCT/EP2015/063116. English translation attached.
(Continued)

*Primary Examiner* — Fenn C Mathew
*Assistant Examiner* — Jennifer Castriotta
(74) *Attorney, Agent, or Firm* — Grossman, Tucker, Perreault & Pfleger, PLLC

(57) ABSTRACT

The present invention relates to a pressure vessel, comprising a connecting element, an inner vessel and a support shell which surrounds the inner vessel, wherein the pressure vessel has the following features: the connecting element comprises a neck section in the form of a sleeve and a shoulder section; the connecting element is bonded via its outer face to an inner face of the inner vessel; the inner vessel is bonded to the support shell in such a way that the inner vessel is arranged in a sandwich-like manner at least in sections between the connecting element and the support shell; and the pressure vessel has at least one orifice delimited by the neck section of the connecting element, wherein the pressure vessel is characterized in that the outer face of the connecting element facing the inner vessel at least partly has a mean roughness of more than 50 µm.

12 Claims, 4 Drawing Sheets

(51) Int. Cl.
  *B29C 49/16* (2006.01)
  *B29C 49/20* (2006.01)
  *B29L 31/00* (2006.01)
  *F17C 13/06* (2006.01)
  *F17C 13/08* (2006.01)

(52) U.S. Cl.
  CPC .......... *B29C 49/0073* (2013.01); *B29C 49/16* (2013.01); *B29C 49/20* (2013.01); *B29C 2049/2026* (2013.01); *B29L 2031/7156* (2013.01); *F17C 2201/0109* (2013.01); *F17C 2201/056* (2013.01); *F17C 2201/058* (2013.01); *F17C 2203/0604* (2013.01); *F17C 2203/066* (2013.01); *F17C 2203/0619* (2013.01); *F17C 2203/0663* (2013.01); *F17C 2203/0673* (2013.01); *F17C 2203/0675* (2013.01); *F17C 2205/0305* (2013.01); *F17C 2209/2127* (2013.01); *F17C 2209/221* (2013.01); *F17C 2209/227* (2013.01); *F17C 2221/012* (2013.01); *F17C 2221/033* (2013.01); *F17C 2223/0123* (2013.01); *F17C 2223/0153* (2013.01); *F17C 2223/031* (2013.01); *F17C 2223/036* (2013.01); *F17C 2260/011* (2013.01); *F17C 2270/0178* (2013.01); *F17C 2270/0184* (2013.01); *Y02E 60/321* (2013.01)

(56) References Cited

U.S. PATENT DOCUMENTS

| | | | | |
|---|---|---|---|---|
| 5,253,778 | A * | 10/1993 | Sirosh | ........................ F17C 1/16 220/495.05 |
| 6,190,481 | B1 * | 2/2001 | Iida | ..................... B29C 53/8016 156/153 |
| 8,505,762 | B2 | 8/2013 | Holbach et al. | |
| 2007/0062959 | A1 * | 3/2007 | Sneddon | ................. B29C 70/86 220/590 |
| 2010/0181325 | A1 * | 7/2010 | Jenkins | .................... F17C 13/06 220/586 |
| 2010/0255234 | A1 | 10/2010 | Koetke | |
| 2013/0049256 | A1 * | 2/2013 | Tani | ........................ B29C 49/20 264/249 |
| 2015/0167893 | A1 * | 6/2015 | Nishimoto | ................ F17C 1/16 206/524.3 |
| 2017/0328518 | A1 * | 11/2017 | Pegel | ........................ F17C 1/16 |

FOREIGN PATENT DOCUMENTS

| | | |
|---|---|---|
| DE | 102011052490 | 2/2013 |
| DE | 20 2012 101 004 | 8/2013 |
| EP | 0810081 | 12/1997 |
| EP | 2236903 | 10/2010 |
| EP | 2 573 447 | 3/2013 |
| JP | H10332082 | 12/1998 |
| JP | H1113995 | 1/1999 |
| JP | 2012189106 | 10/2012 |
| KR | 2003159020000 | 5/2003 |
| WO | 2012/099409 | 7/2012 |

OTHER PUBLICATIONS

PCT International Preliminary Report on Patentability dated Sep. 15, 2016, received in corresponding PCT Application No. PCT/EP2015/063116. English translation attached.

PCT International Written Opinion dated Dec. 30, 2015, received in corresponding PCT Application No. PCT/EP2015/063116.

* cited by examiner

PRESSURE VESSEL

FIELD

The present invention relates to a pressure vessel, especially for motor vehicles for accommodating pressurized gases and/or liquids, especially pressurized hydrogen and/or natural gas. The present invention further relates to a method of producing a corresponding pressure vessel.

BACKGROUND

Pressure vessels are used for storage of pressurized gases and/or pressurized liquids. For instance, pressure vessels are already being employed in natural gas-driven motor vehicles. In addition, there are known pressure vessels for motor vehicles that are filled with pressurized hydrogen. The hydrogen can be combusted with oxygen in an internal combustion engine or can react with oxygen to give water in a fuel cell, in which case the electrical energy obtained is fed to an accumulator or an electric motor.

Corresponding pressure vessels have to withstand great stresses. Pressure vessels for natural gas are filled, for example, with a pressure up to 250 bar. Pressure vessels for hydrogen are filled with up to 700 bar.

EP 0 810 081 A1 discloses a pressure vessel comprising a connecting element, and inner vessel and a support shell which surrounds the inner vessel. The connecting element comprises a neck section in the form of a sleeve and a shoulder section and is connected via its outer face to an inner face of the inner vessel. The inner vessel is bonded to the support shell in such a way that the inner vessel is arranged in a sandwich-like manner between the connecting element and the support shell in the region of the bond to the connecting element. The pressure vessel has an orifice bounded by the neck section in the form of a sleeve of the connecting element. The neck section of the connecting element also has an inner thread into which a valve unit is screwed, the latter being connectable to a supply line.

Because of the varying compressive stress on the pressure vessels, these are particularly highly stressed especially in the region of the bond of the connecting element to the inner vessel. Moreover, the pressure vessels have to withstand very high stresses especially in the case of an accident. In the case of a drop test where the pressure vessel is allowed to fall onto the connecting element, great stresses occur at the bond surface between the attachment element and the inner vessel.

In the case of the pressure vessel known from EP 0 810 081 A1, the effect of the varying compressive stress is that the bond surface between the connecting element and the inner vessel is subject to great shear forces and the connecting element can be detached relatively easily from the inner vessel. The same applies to a drop test where the pressure vessel is allowed to fall onto the attachment element. In the case of a corresponding drop test, the connecting element becomes detached relatively easily from the inner vessel, which leads to escape of the hydrogen or the natural gas from the pressure vessel. Moreover, the pressure vessel known from EP 0 810 081 A1 has the problem that, on exceedance of a particular torque which is exerted on the connecting element, the connecting element becomes detached from the inner vessel, and so hydrogen or natural gas escapes from the pressure vessel in this case too.

EP 2 573 447 A1 discloses a pressure vessel comprising a mouth member having a metallic top component, an inner vessel and a support shell which surrounds the inner vessel. The metallic top component comprises a neck section in the form of a sleeve and a surrounding flange. The surrounding flange has been provided with a surface coating arranged between the surrounding flange and a bonding component consisting of plastic. It is also possible for a bonding layer to be provided between the bonding component consisting of plastic and an inner face of the inner vessel. In addition, EP 2 573 447 A1 states that the top component can be roughened by sandblasting or shotblasting or by means of chemical surface treatment.

SUMMARY

The object underlying the present invention is that of providing a more stable pressure vessel. It is a further object of the invention to provide an improved method of producing a corresponding pressure vessel.

The present invention relates to a pressure vessel, comprising a connecting element, an inner vessel and a support shell which surrounds the inner vessel, wherein the pressure vessel has the following features:

the connecting element comprises a neck section in the form of a sleeve and a shoulder section;

the connecting element is bonded via its outer face to an inner face of the inner vessel;

the inner vessel is bonded to the support shell in such a way that the inner vessel is arranged in a sandwich-like manner at least in sections between the connecting element and the support shell; and the pressure vessel has at least one orifice delimited by the neck section of the connecting element, wherein the pressure vessel is characterized in that the outer face of the connecting element facing the inner vessel at least partly has a mean roughness of more than 50 µm.

In addition, the object of the present invention is achieved by the pressure wherein the coating fully covers the entire outer face of the neck section of the connecting element and fills the at least one circumferential groove.

More specifically, the pressure vessel of the invention comprises a connecting element, an inner vessel and a support shell which surrounds the inner vessel. The connecting element comprises a neck section in the form of a sleeve and a shoulder section. In addition, the connecting element is bonded via its outer face to an inner face of the inner vessel. The inner vessel in turn is bonded to the support shell in such a way that the inner vessel is arranged in a sandwich-like manner at least in sections between the connecting element and the support shell. The pressure vessel has at least one orifice delimited by the neck section of the connecting element. It is a characteristic feature of the pressure vessel of the invention that the outer face of the connecting element facing the inner vessel at least partly has a mean roughness of more than 50 µm. The outer face of the connecting element is the face arranged opposite the inner vessel. Moreover, the pressure vessel of the invention is characterized in that the outer face of the connecting element has at least partly been provided with a coating of thermoplastic polymer. Moreover, the pressure vessel of the invention is characterized in that the outer face of the neck section of the connecting element has at least one circumferential groove running in circumferential direction of the neck section. Moreover, the pressure vessel of the invention is characterized in that the coating fully covers the entire outer face of the neck section of the connecting element and fills the at least one circumferential groove.

The mean roughness indicates the mean distance of a measurement point on a surface from a midpoint line. The midpoint line intersects the actual profile of the connecting element within the reference zone such that the sum total of the profile deviations is minimized based on the midpoint line. The mean roughness thus corresponds to the arithmetic average of the deviations from the midpoint line.

The mean roughness of the outer face of the connecting element is preferably between 50 µm and 1000 µm, further preferably between 50 µm and 500 µm, further preferably between 80 µm and 250 µm and most preferably more than 120 µm.

The connecting element may be manufactured from a metal, especially from aluminum. An inner thread may be arranged within the sleeve-like neck section of the connecting element, in order to screw in a valve unit for example.

The inner vessel is preferably a blow-molded inner vessel. The inner vessel preferably takes the form of a multilayer inner vessel and may comprise, for example, an outer layer composed of HDPE (high-density polyethylene), an adhesion promoter composed, for example, of LDPE (low-density polyethylene), a barrier layer composed, for example, of EVOH (ethylene-vinyl alcohol copolymer), a further adhesion promoter composed, for example, of LDPE, and an inner layer composed of HDPE. Other layer systems for the inner vessel are also possible; in this respect, there are no restrictions with regard to the layer structure of the inner vessel.

The support shell may especially be formed from carbon fiber-reinforced polymer. Preferably, the support shell consists of a carbon fiber-reinforced thermoplastics.

The inner vessel can also be referred to as lining and/or as inner shell and/or as liner and/or as inliner. The support shell can also be referred to as outer jacket. The connecting element can also be referred to as connecting flange and/or as insert and/or as attachment piece and/or as pole piece.

Because of the mean roughness of the outer face of more than 50 µm, the surface area of the connecting element in contact with the inner vessel is increased, such that the connecting element is more stably bonded to the inner vessel. Both axial durability and radial stress on the connecting element is increased compared to pressure vessels known from the prior art, since the bond strength of the connecting element to the inner vessel is increased.

The thermoplastic polymer may, for example, be polyethylene, especially low-density polyethylene (LDPE). By coating the outer face of the connecting element with a thermoplastic polymer, it is possible to fill the depressions in the outer face of the connecting element particularly effectively with the thermoplastic material, such that the available bonding face of the connecting element or the outer face of the connecting element can be utilized particularly effectively. Moreover, the coating of the outer face of the connecting element can enter into a cohesive bond with the inner vessel of the pressure vessel in the bonding operation. All of this leads to another strengthening of the bond between the connecting element and the inner vessel.

On application of a coating consisting of thermoplastic polymer to the outer face of the connecting element that is thinner than the mean roughness of the outer face of the connecting element, parts of the outer face project out of the applied coating, such that these parts of the outer face, on bonding of the connecting element to the inner vessel, in addition to the cohesive bond, form a form-fitting connection to the inner vessel.

The outer face may of course also have a multitude of corresponding circumferential grooves. Through provision of the circumferential groove(s), the bond of the connecting element to the inner vessel is strengthened such that the connecting element has higher axial stressability without destruction of the bond to the inner vessel. Moreover, for establishment of the bond of the connecting element to the inner vessel, merely an axial application of force to the connecting element is necessary. The connecting element is drawn or pressed into the thermoplasticized inner vessel with a tensile force oriented parallel to the longitudinal axis thereof.

This ensures that the coating is particularly effectively intermeshed with the circumferential groove, such that, after a process of bonding the coating to the inner face of the inner vessel, particularly high forces can be transmitted to the connecting element without destruction of the bond between connecting element and inner vessel. The coating forms a continuous surface of the connecting element.

Preferably, the outer face of the shoulder section of the connecting element has at least one radial groove having an extension component in the radial direction of the connecting element. In the case of a corresponding configuration of the connecting element, the pressure vessel has higher stability under rotational stress on the connecting element. It is thus possible to exert higher torques on the connecting element without the connecting element becoming detached from the inner vessel.

Preferably, the coating fully covers the entire outer face of the shoulder section and fills the at least one radial groove. The effect of this is that the radial grooves can absorb increased forces under radial stress on the connecting element. Moreover, a correspondingly coated connecting element with a continuous coating surface can be bonded in an improved manner to the inner face of the inner vessel.

The object underlying the present invention is further achieved by a method of producing a pressure vessel having a connecting element, an inner vessel and a support shell which surrounds the inner vessel, wherein the method comprises the following method steps:

introducing a connecting element into a multipart blow mold which is in an opened receiving position and which, in a closed position, forms a mold cavity;

extruding a tubular parison into the blow mold in the receiving position in such a way that the connecting element is surrounded by the tubular parison;

closing the blow mold, such that the parison is pressed onto an outer face of the connecting element by means of the blow mold;

molding the parison in the mold cavity of the closed blow mold by applying a pressure differential to form the inner vessel;

opening the blow mold and extracting the inner vessel from the blow mold; surrounding the inner vessel with the support shell; and roughening an outer face of the connecting element prior to the introduction of the connecting element into the blow mold, such that the outer face thereof at least partly has a mean roughness of 50 µm.

The method of the invention is characterized in that the outer face of the connecting element is roughened by applying a material layer to the outer face of the connecting element.

Preferably, the outer face of the connecting element is roughened by blasting with an abrasive blasting medium on the outer face thereof. The blasting medium may be any desired abrasive blasting medium, for example sand (sandblasting). Abrasive media used may also be ceramic particles, steel particles, steel shot, corundum and white corundum. Corresponding roughening of the outer face by means of blasting with an abrasive blasting medium is possible in a particularly simple manner and, moreover, by comparison with etching of the outer face, for example, does not require any potentially hazardous etchants. Moreover, by blasting with an abrasive blasting medium, it is possible to achieve a higher roughness, as a result of which the bond strength of the connecting elements to the inner vessel can be increased. Moreover, the roughening of the outer face of the connecting element does not require any chemical etchant which is harmful to health and the environment. The outer face of the connecting element and the inner face of the inner vessel enter into an intimate cohesive bond. The application can be effected, for example, by selective laser melting. A corresponding roughening method offers the advantage that it is possible to selectively endow areas of the outer face of the connecting element with different roughnesses.

Preferably, after the method step of roughening of the connecting element and prior to the method step of the introduction into the blow mold, the outer face of the connecting element is coated with a coating of thermoplastic polymer. As already discussed above, coating of the outer face of the connecting element ensures that the surface of the connecting element is covered particularly effectively with thermoplastic material, such that intimate intermeshing between the thermoplastic material that constitutes the coating and the outer face of the connecting element is achieved.

On application of a coating consisting of thermoplastic polymer to the outer face of the connecting element that is thinner than the mean roughness of the outer face of the connecting element, parts of the outer face project out of the applied coating, such that these parts of the outer face, on bonding of the connecting element to the inner vessel, in addition to the cohesive bond, form a form-fitting connection to the inner vessel.

Preferably, the coating is applied on the outer face of the connecting element by producing a plasma jet directed onto the outer face of the connecting element, into which the thermoplastic polymer that forms the coating is fed into the plasma jet in powder form, with movement of the plasma jet and/or the connecting element relative to one another in such a way that the plasma jet traverses the entire outer face of the connecting element.

This coating method makes it possible to achieve variable coating thicknesses. It is also possible to endow various outer face regions of the connecting element with different coating thicknesses.

The particle size of the thermoplastic polymer in powder form that forms the coating of the connecting element is preferably within the size range between 1 µm and 500 µm, further preferably between 2 µm and 400 µm, further preferably between 5 µm and 200 µm, further preferably between 10 µm and 100 µm and most preferably between 20 µm and 50.

As a result of the feeding of the thermoplastic polymer in powder form into the plasma jet, the thermoplastic polymer is melted at least at the surface, such that, on contact with the at least partly molten thermoplastic polymer, it adapts particularly well to the surface of the connecting element, such that particularly effective intermeshing of the coating with the outer face of the connecting element is achieved. For the plasma jet, preference is given to using a gas composed, for example, of 98.5% nitrogen and 1.5% hydrogen.

In the case that the surface of the connecting element is coated by means of thermoplastic polymer fed into a plasma jet, it is also possible, prior to the feeding of the thermoplastic polymer, to inject a metal powder, preferably composed of the same material that the surface of the connecting element consists of, into the plasma jet, such that the metal powder arrives at the surface of the connecting element in an at least partly molten state, which increases the mean roughness to the desired degree.

Preferably, the surface of the connecting element is cleaned by the plasma jet prior to application of the coating, by moving the plasma jet across the surface of the connecting element with no feeding of the thermoplastic polymer powder, such that contaminations are reliably removed.

Further advantages, details and features of the invention are apparent from the working examples and elucidated hereinafter.

DETAILED DESCRIPTION

Figure 1:
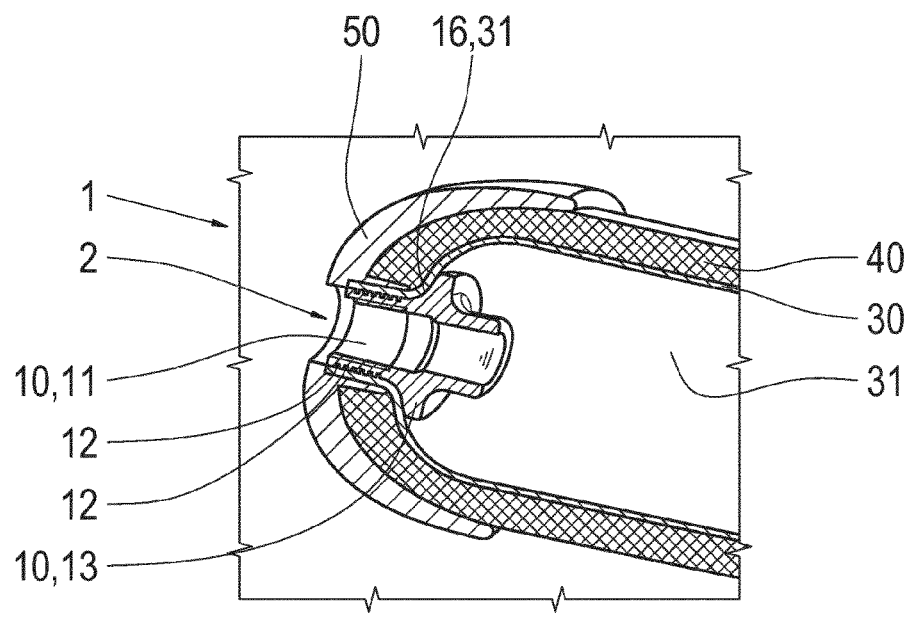
FIG. 1 is a three-dimensional diagram of a section of a pressure vessel of the invention.
Figure 2:
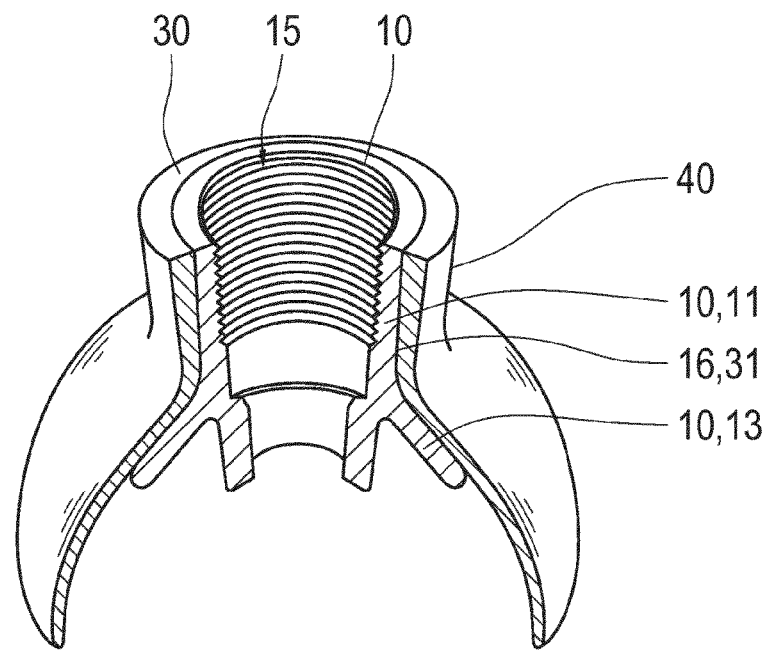
FIG. 2 is a three-dimensional diagram of a section of a pressure vessel without the support shell in the region of the pole cap.

In the description which now follows, identical reference numerals denote the same components or the same features, such that a description with regard to one component conducted in relation to one figure also applies to the other figures, and so repetitive description is avoided.

As apparent from FIG. 1, the inventive pressure vessel 1 has a connecting element 10 bonded to an inner vessel 30 of the pressure vessel 1. The pressure vessel 1 further comprises a support shell 40 which surrounds the inner vessel 30. The pressure vessel 1 has at least one orifice 2 delimited by a neck section 11 of the connecting element 10. It is of course also possible that the inventive pressure vessel 1 has not only one orifice 2, but that two orifices are provided at opposite end regions of the pressure vessel, in which case two connecting elements 10 are also bonded to the inner vessel 30 at the two opposite end regions.

It is apparent from FIG. 1 that the end region of the pressure vessel 1 has been provided with an impact guard 50 in the form of a cap 50. The cap 50 distributes forces exerted on the pressure vessel 1 axially over a greater area. These forces with at least one axial direction can occur, for example, in the event of an accident or in the event of the pressure vessel 1 falling.

As apparent from FIGS. 1 to 6, the connecting element 10 has a neck section 11 in the form of a sleeve and a shoulder section 13 cohesively bonded thereto. The connecting element 10 is bonded via its outer face 16 to an inner face 31 of the inner vessel 30. The outer face 16 of the connecting element 10 is the area bonded to the inner vessel 30, more specifically to the inner face 31 of the inner vessel 30.

FIG. 1 shows that the inner vessel 30, in the region of the orifice 2 of the pressure vessel 1, is bonded to the support shell 40 in such a way that the inner vessel 30 is arranged in a sandwich-like manner between the connecting element 10 and the support shell 40. Moreover, it is apparent especially from FIGS. 1 and 2 that the orifice 2 of the pressure vessel 1 is delimited by the neck section 11 of the connecting element 10.

The connecting element 10 may be manufactured from a metal. In the present working example, the connecting element 10 is manufactured from aluminum. The inner vessel 30 may be formed from a thermoplastic material. The thermoplastic material may have a multilayer structure, in which case, for example, an EVOH layer arranged in the middle may be bonded to two outer layers consisting of HDPE by means of two adhesion promoters, for example in the form of LDPE layers. The support shell 40, which can also be referred to as outer shell 40, is formed from a fiber-reinforced plastic. More particularly, the support shell 40 may be formed from CRP (carbon-reinforced plastic), in which case the plastic is preferably a thermoplastic polymer.

Because of the varying compressive stress on the pressure vessel 1, the bond between the connecting element 10 and the inner vessel 30, which can also be referred to as inner shell 30 or lining 30 or liner 30, has to be particularly stable. Firstly axial forces which are caused by the pressure differential between the external pressure and the internal pressure of the pressure vessel 1 and secondly radial forces are transmitted to the connecting element, which can cause the connecting element 10 to become detached from the pressure vessel 1 by rotation.

To increase the bond strength between the connecting element 10 and the inner vessel 30, the outer face 16 of the connecting element 10 facing the inner vessel 30 at least partly has a mean roughness of more than 50 μm. The mean roughness is preferably between 50 μm and 1000 μm. The rougher the outer face 16, the greater the effective bonding area of the connecting element 10. Thus, the connecting element 10 having a roughened outer face 16 can enter into a more intimate and cohesive bond with the inner face 31 of the inner vessel 30. When the still thermoplasticized inner vessel 30 or a still thermoplasticized parison is pressed onto the outer face 16 of the connecting element 10, the thermoplasticized material adapts to the rough surface 16 of the connecting element 10, such that a stable cohesive bond is established between the connecting element 10 and the inner vessel 30.

The outer face 16 of the connecting element 10 can be effected, for example, by blasting of an abrasive blasting agent onto the outer face 16. For example, the outer face 16 can be sandblasted. In addition, it is possible that the outer face 16 is also blasted with ceramic particles or with steel particles or else, for example, with steel shot. In the case of corresponding blasting with an abrasive blasting agent, it is possible to produce a very rough outer face 16 having a high mean roughness of more than 50 μm. Correspondingly high mean roughnesses are possible only with difficulty, if at all, by an etching method for example. Moreover, in the case of roughening of the outer face by an etching method, it is necessary to use correspondingly hazardous chemical substances.

In addition, it is possible to achieve roughening of the outer face 16 of the connecting element 10 by applying a material layer to the outer face 16 of the connecting element 10. The material can be applied, for example, by selective laser melting. For example, it is possible to blast an aluminum powder onto the outer face 16 of the connecting element 10, while a high-powered laser beam is used to irradiate the contact region of the aluminum powder with the outer face 16, such that the aluminum particles melt at least at the surface, such that they are able to enter into a cohesive bond with the outer face 16.

Figure 3:
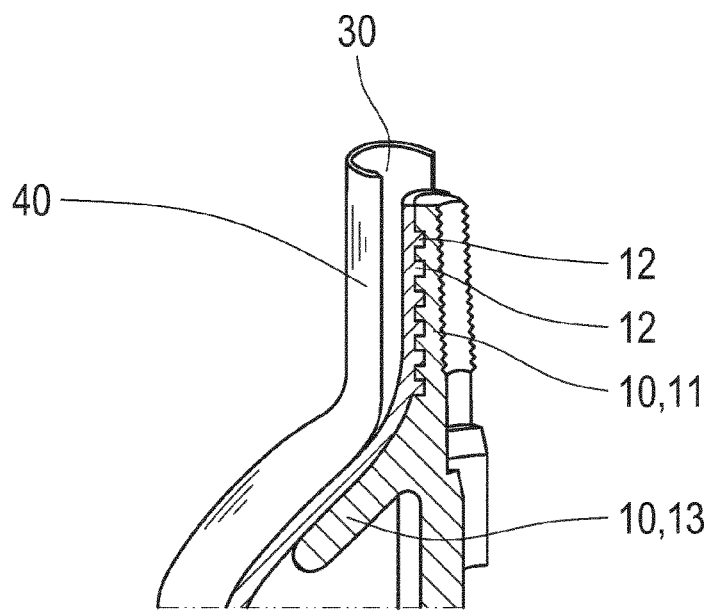
FIG. 3 is a section diagram of a pressure vessel of the invention without the support shell, from which the bond of the connecting element to the inner vessel is apparent, in the region of the pole cap.
Figure 4:
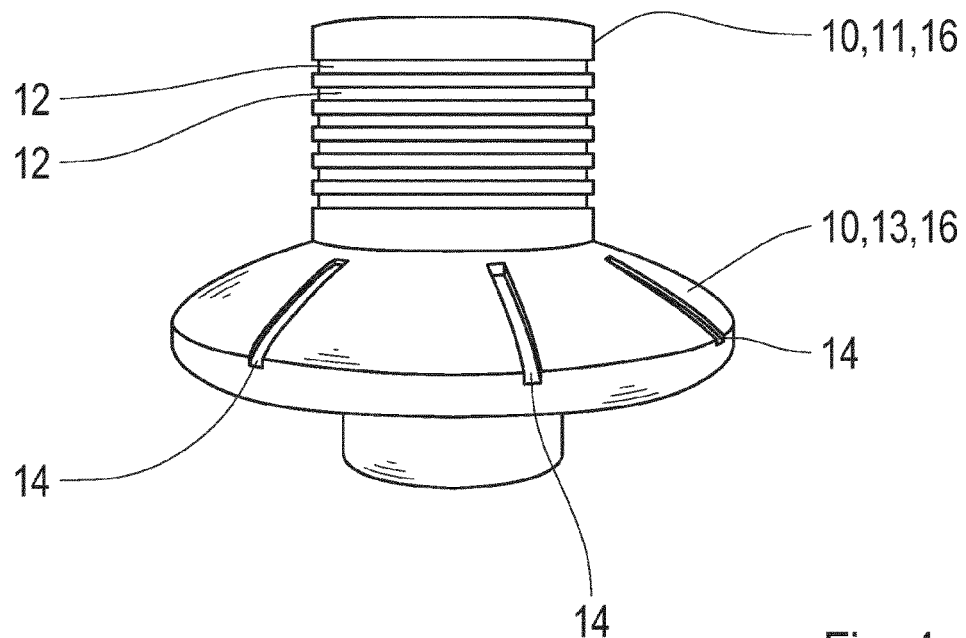
FIG. 4 is a diagram of a connecting element including radial grooves and circumferential grooves which have been introduced on the outer face of the connecting element.

As apparent from FIGS. 3 and 4 in particular, a plurality of circumferential grooves 12 extending in circumferential direction of the neck section 11 may be formed on the outer face 16 of the next section 11 of the connecting element 10. In addition, a plurality of radial grooves 14 may be formed on the outside 16 of the shoulder section 13 of the connecting element 10, in which case the radial grooves 14 have an extension component in radial direction of the connecting element 10. As a result of pressing of the still thermoplasticized parison 30 onto the outer face 16 of the connecting element 10, the thermoplasticized material fills the circumferential grooves 12 and the radial grooves 14, such that a more stable bond between the connecting element 10 and the inner vessel 30 is achieved. Through provision of the circumferential grooves 12, it is possible for greater axial forces to be exerted on the connecting element 10 without breaking of the bond between the connecting element 10 and the inner vessel 30. The effect of the radial grooves 14 is that greater torque forces can be transmitted to the connecting element 10 without destruction of the bond between the connecting element 10 and the inner vessel 30.

It is of course also possible for the outer face 16 shown in FIG. 4, having the circumferential grooves 12 and the radial grooves 14, to be roughened by a blasting method or by an application method, such that it is then possible to achieve stronger bonds again between the connecting element 10 and the inner vessel 30.

Figure 5:
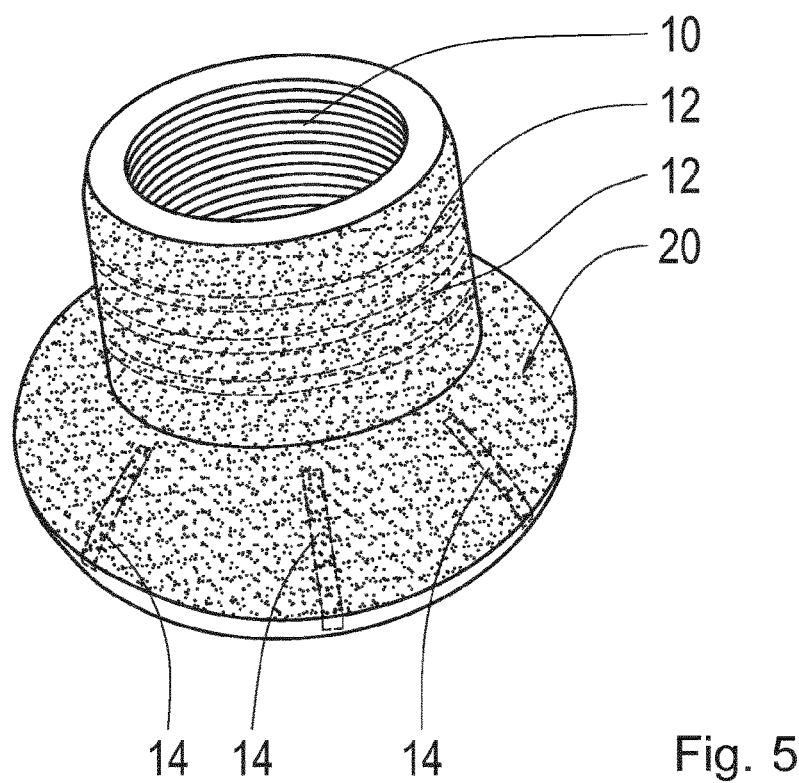
FIG. 5 is the connecting element shown in FIG. 4, provided with a coating.
Figure 6:
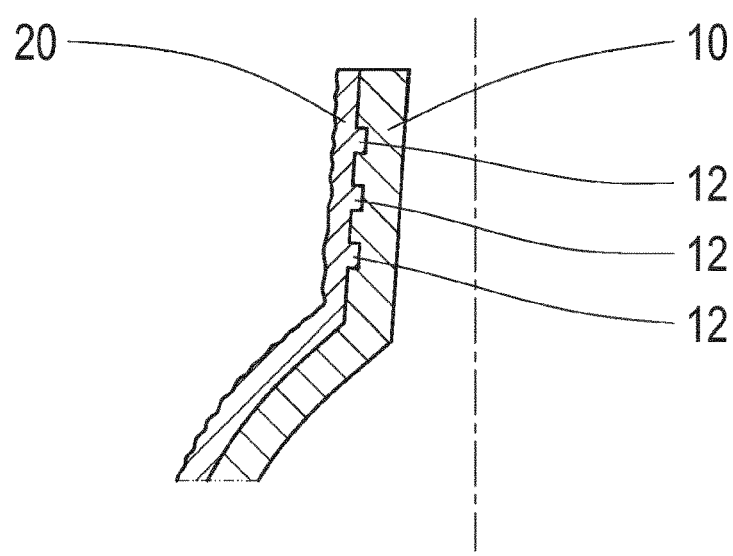
FIG. 6 is the connecting element shown in FIG. 5 including the coating in cross-sectional diagram.

It is apparent from FIGS. 5 and 6 that the outer face 16 of the connecting element 10 has been provided with a coating 20 of thermoplastic polymer. The thermoplastic polymer of the coating 20 may, for example, be polyethylene, especially low-density polyethylene (LDPE).

It is apparent from FIGS. 5 and 6 that the thickness of the coating 20 is so great that all the circumferential grooves 12 and all the radial grooves 14 have been filled with the coating 20. Consequently, the coating 20 forms a continuous surface which can be cohesively bonded to the inner face 31 of the inner vessel 30. By application of the coating 20 on the outer face 16 of the connecting element 10, it is possible for the uneven points in the outer face 16 caused by the roughening of the outer face to be filled particularly well by the thermoplastic material of the coating 20, such that a particularly intimate and stable bond between the coating 20 and the connecting element 10 is brought about. The coating 20 enters into a cohesive bond with the inner face 31 of the inner vessel 30, such that a more stable bond again between the connecting element 10 and the inner vessel 30 can be achieved in this way.

Figure 7:
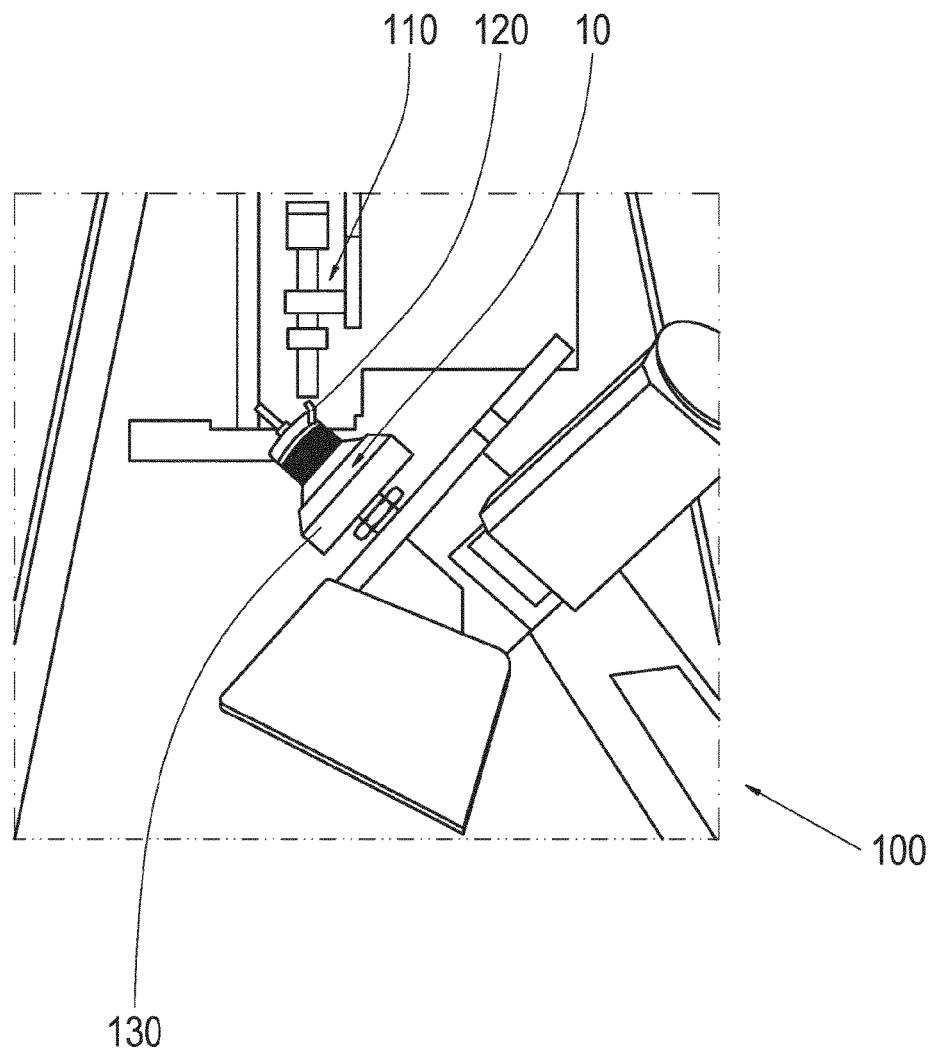
FIG. 7 is a coating apparatus for cleaning and coating a connecting element.

FIG. 7 shows a coating apparatus 100 for coating the outer face 16 of the connecting element 10. The coating apparatus comprises a coating head 110 for production of a plasma jet 120. In addition, the coating apparatus 100 comprises a turntable 130 on which the connecting element 10 to be coated is secured. The coating head 110 may also be arranged on a displacement table, such that the coating head can follow the contour of the connecting element 10. Preferably, prior to the coating of the outer face 16 of the connecting element 10, the outer face 16 is cleaned by the plasma jet 120, in that the plasma jet traverses the surface of the connecting element 10. This traversing of the outer face 16 frees it of contaminants. After the screening step, thermoplastic polymer in powder form is fed to the plasma jet by means of a feed line which is not shown, such that the thermoplastic polymer in powder form is wholly or at least partly melted in the plasma jet. The polymer particles which have been melted at least at the surface meet the outside 16 of the connecting element and adapt to the outer face 16. As a result of the movement of the plasma jet and/or the connecting element 10 relative to one another, the plasma jet traverses the entire outer face 16 of the connecting element 10. In this way, it can be ensured that a continuous coating 20 is applied on the outer face 16.

The application of the coating 20 on the outer face 16 can be achieved, for example, by meandering movement of the plasma jet on the outer face 16. In addition, it is also possible that the coating is formed by annular coating tracks. In this respect, there are no restrictions with regard to the movement characteristics of the plasma jet 120 relative to the outer face 16.

The connecting element 10 coated in this way can be introduced into a multipart blow mold which is in an opened receiving position, and the blow mold in a closed position forms a mold cavity. Subsequently, a tubular parison can be extruded into the blow mold in the receiving position in such a way that the connecting element 10 is surrounded by the tubular parison. Subsequently, the blow mold can be closed, such that the parison is pressed onto an outer face 16 of the connecting element 10 by means of the blow mold. The parison is still in the thermoplasticized state, and so it is able to adapt to the contour of the connecting element. By applying a pressure differential, the parison is molded in the mold cavity of the closed blow mold. After the blow mold has been opened, the inner vessel 30 can be extracted from the blow mold and then provided with the support shell.

LIST OF REFERENCE NUMERALS 1 pressure vessel
2 orifice (of the pressure vessel)
10 connecting element, connecting flange, insert, attachment piece
11 neck section
12 circumferential groove
13 shoulder section
14 radial grooves
15 inner thread
16 outer face (of the connecting element)
20 coating
30 inner vessel, lining, inner shell, liner, inliner
31 inner face (of the inner vessel)
40 support shell, outer shell (comprising fiber-reinforced plastic)
50 impact guard, cap
100 coating apparatus
110 coating head
120 plasma jet
130 turntable

What is claimed is:

1. A pressure vessel, comprising:
a connecting element;
an inner vessel;
a support shell which surrounds the inner vessel;
wherein the connecting element comprises a neck section in a form of a sleeve and a shoulder section;
wherein the connecting element is bonded via an outer face thereof to an inner face of the inner vessel;
wherein the inner vessel is bonded to the support shell such that the inner vessel is arranged in a sandwich-like manner at least in sections between the connecting element and the support shell;
wherein the pressure vessel has at least one orifice defined by the neck section of the connecting element;
wherein at least a portion of the outer face of the connecting element facing the inner vessel has a mean roughness of 50 µm or more;
wherein at least a portion of the outer face of the connecting element has a coating of thermoplastic polymer;
wherein the outer face of the neck section of the connecting element has at least one circumferential groove extending in a circumferential direction of the neck section; and
wherein the coating of thermoplastic polymer fully covers an entirety of the outer face of the neck section of the connecting element and fills the at least one circumferential groove.

2. The pressure vessel as claimed in claim 1, wherein the outer face of the shoulder section of the connecting element has at least one radial groove having an extension component in the radial direction of the connecting element.

3. The pressure vessel as claimed in claim 2, wherein the coating of thermoplastic polymer fully covers an entirety of the outer face of the shoulder section of the connecting element and fills the at least one radial groove.

4. The pressure vessel as claimed in claim 1, wherein the mean roughness of 50 µm or more is between 50 µm and 1,000 µm.

5. The pressure vessel as claimed in claim 1, wherein the mean roughness of 50 µm or more is between 50 µm and 500 µm.

6. The pressure vessel as claimed in claim 1, wherein the connecting element is formed of metal.

7. The pressure vessel as claimed in claim 1, wherein the connecting element includes an internal thread in the neck section.

8. The pressure vessel as claimed in claim 1, wherein the inner vessel is blow-molded.

9. The pressure vessel as claimed in claim 1, wherein the inner vessel is formed of thermoplastic.

10. The pressure vessel as claimed in claim 1, wherein the inner vessel is mutilayered.

11. The pressure vessel as claimed in claim 1, wherein the support shell is formed of fiber-reinforced plastic.

12. The pressure vessel as claimed in claim 1, wherein at least a portion of the coating of thermoplastic polymer has a thickness that is thinner than the mean roughness of the outer face of the connecting element.

* * * * *